(12) United States Patent
Kim et al.

(10) Patent No.: US 9,034,520 B2
(45) Date of Patent: May 19, 2015

(54) POSITIVE ACTIVE MATERIAL FOR LITHIUM SECONDARY BATTERY

(75) Inventors: Young-Ki Kim, Yongin-si (KR);
Young-Hun Lee, Yongin-si (KR);
Soon-Rewl Lee, Yongin-si (KR);
Jay-Hyok Song, Yongin-si (KR);
Ick-Kyu Choi, Yongin-si (KR);
Yong-Chul Park, Yongin-si (KR);
Yoon-Chang Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 985 days.

(21) Appl. No.: 13/093,285

(22) Filed: Apr. 25, 2011

(65) Prior Publication Data

US 2012/0015252 A1    Jan. 19, 2012

(30) Foreign Application Priority Data

Jul. 15, 2010   (KR) .................. 10-2010-0068581

(51) Int. Cl.
*H01M 4/48*        (2010.01)
*H01M 4/485*       (2010.01)
*C01G 39/00*       (2006.01)
*C01G 45/12*       (2006.01)
*C01G 51/00*       (2006.01)
*C01G 53/00*       (2006.01)
(Continued)

(52) U.S. Cl.
CPC ............... *H01M 4/485* (2013.01); *C01G 39/00* (2013.01); *C01G 45/1221* (2013.01); *C01G 51/42* (2013.01); *C01G 51/44* (2013.01); *C01G 53/42* (2013.01); *C01G 53/44* (2013.01); *C01P 2002/72* (2013.01); *C01P 2004/03* (2013.01); *C01P 2004/80* (2013.01); *C01P 2004/82* (2013.01); *C01P 2006/40* (2013.01); *H01M 4/131* (2013.01); *H01M 4/364* (2013.01); *H01M 4/525* (2013.01); *H01M 10/052* (2013.01); *H01M 2300/0082* (2013.01); *Y02E 60/122* (2013.01)

(58) Field of Classification Search
CPC ........................................................ H01M 4/485
USPC ............................................ 429/231.1, 218.1
See application file for complete search history.

(56) References Cited

U.S. PATENT DOCUMENTS 6,346,348 B1   2/2002  Nakajima et al.
2004/0121234 A1*  6/2004  Le .............................. 429/231.1
(Continued)

FOREIGN PATENT DOCUMENTS

EP   0391281 A2   3/1990
JP   06-342673 A  12/1994
(Continued)

OTHER PUBLICATIONS

Notice of Allowance dated Sep. 17, 2012 of corresponding Korean Patent Application No. 10-2010-0068581—5 pages.

*Primary Examiner* — Milton I Cano
*Assistant Examiner* — Brent Thomas
(74) *Attorney, Agent, or Firm* — Knobbe Martens Olson & Bear LLP

(57) ABSTRACT

Disclosed is a positive active material for a lithium secondary battery. The positive active material includes a lithium molybdenum oxide having an X-ray diffraction (XRD) pattern with peaks at 11.5±2°, 21±2°, 38±2°, and 64±2° 2-theta (2θ) and represented by Formula 1: $Li_xMoO_3$, where $1<x\leq 3$. Also disclosed is a method of preparing the positive active material.

8 Claims, 5 Drawing Sheets

(51) Int. Cl.
*H01M 4/131* (2010.01)
*H01M 4/36* (2006.01)
*H01M 4/525* (2010.01)
*H01M 10/052* (2010.01)

(56) References Cited

U.S. PATENT DOCUMENTS

2009/0325072 A1* 12/2009 Maeda et al. ................ 429/220
2010/0143799 A1  6/2010 Park

FOREIGN PATENT DOCUMENTS

| | | | |
|---|---|---|---|
| JP | 2004-363015 | A | 12/2004 |
| JP | 2007-018985 | A | 1/2007 |
| KR | 10-2004-0092245 | A | 11/2004 |
| KR | 10-2007-0008110 | A | 1/2007 |
| KR | 10-2007-0033880 | A | 3/2007 |
| KR | 10-2007-0118933 | A | 12/2007 |
| KR | 10-2009-0025869 | A | 3/2009 |
| KR | 10-2010-0064632 | A | 6/2010 |

* cited by examiner

POSITIVE ACTIVE MATERIAL FOR LITHIUM SECONDARY BATTERY

RELATED APPLICATIONS

This application claims the benefit of Korean Patent Application No. 10-2010-0068581, filed on Jul. 15, 2010, in the Korean Intellectual Property Office, the disclosure of which is incorporated herein in its entirety by reference.

BACKGROUND

1. Field

The present disclosure relates to a positive active material for a lithium secondary battery.

2. Description of the Related Art

Recently, lithium batteries have drawn significant attention as power sources for small portable electronic devices. Lithium secondary batteries using an organic electrolyte have a discharge voltage about twice as high as those batteries using an aqueous alkali electrolyte.

Lithium batteries have been widely adopted along with rapid increase of the demand for portable devices such as wireless telephones, personal digital assistants (PDA), or notebook computers. Recently, lithium batteries have also been used in electrical vehicles. In addition, the demand for high-energy density lithium batteries is significantly increasing as the lithium batteries are increasingly miniaturized and becoming to have higher performance. While the technologies of lithium batteries have been remarkably developed, still better performance is desired.

The energy of a lithium secondary battery is mainly dependant on the positive active material. Commercially available small-sized lithium secondary batteries typically use the layered compound of $LiCoO_2$ as a positive active material. $LiCoO_2$ is an excellent material having stable charge/discharge characteristics, excellent electronic conductivity, high thermal stability, and flat discharging voltage characteristics. However, cobalt (Co) is expensive and so is $LiCoO_2$. The actual electrical capacity of $LiCoO_2$ is in the range of about 140 to about 150 mA h/g, which is 50% of a theoretical capacity thereof.

Currently, $LiNiO_2$, $LiCo_xNi_{1-x}O_2$ (0<x<2, and M is Ni, or the like), $Li_2MoO_3$, and $LiM_xMn_{2-x}O_4$ have been actively developed as positive active materials. However, $LiNiO_2$ is difficult to be commercialized due to difficulty in synthesis and its poor thermal characteristics. $LiCo_xNi_{1-x}O_2$ does not have good performance to replace $LiCoO_2$ as a positive active material. It has been known that, when layered $Li_2MoO_3$, or $LiM_xMn_{2-x}O_4$ having a spinel structure, is used as a positive active material, a lithium salt or organic solvent of an electrolyte is dissolved at a high voltage (4.9 V) and a high temperature, and manganese (Mn) or molybdenum (Mo) is eluted by HF generated when the lithium salt reacts with moisture, thereby causing deterioration of charge/discharge characteristics at high temperature environments.

SUMMARY

One or more embodiments of the present invention include a positive active material including a lithium molybdenum oxide having a novel X-ray diffraction (XRD) pattern. One or more embodiments include a positive electrode including the positive active material. One or more embodiments of the present invention include a lithium secondary battery including the positive electrode. One or more embodiments of the present invention include a method of preparing the positive active material. Additional aspects will be set forth in part in the description which follows and, in part, will be apparent from the description, or may be learned by practice of the presented embodiments.

One aspect of the invention provides a positive active material comprising a lithium molybdenum oxide having an X-ray diffraction (XRD) pattern with peaks at 11.5±2°, 21±2°, 38±2°, and 64±2° 2-theta (2θ) and represented by Formula 1: $Li_xMoO_3$, where 1<x≤3.

In the positive active material, x may be about 1.95 or 2.05 in Formula 1. The lithium molybdenum oxide may comprise $Li_{1.95}MoO_3$. The lithium molybdenum oxide may comprise $Li_{2.05}MoO_3$. The lithium molybdenum oxide may be in the form of particles having an average diameter from about 5 to about 10 μm. The positive active material may further comprise at least one lithium transition metal oxide selected from the group consisting of: $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-Y}Co_YO_2$, where 0≤Y<1; $LiCo_{1-Y}Mn_YO_2$, where 0≤Y<1; $LiNi_{1-Y}Mn_YO_2$, where 0≤Y<1; $Li(Ni_aCo_bMn_c)O_4$, where 0<a<2, 0<b<2, 0<c<2, and a+b+c=2; $LiMn_{2-Z}Ni_ZO_4$, where 0<Z<2; $LiMn_{2-Z}Co_ZO_4$, where 0<Z<2; $LiCoPO_4$; and $LiFePO_4$.

In the foregoing positive active material, a weight ratio of the at least one lithium transition metal oxide to the lithium molybdenum oxide may be about 50:50 to about 99:1. The at least one lithium transition metal oxide may comprise $LiCoO_2$.

Another aspect of the invention provides a positive electrode comprising the foregoing positive electrode active material layer, a conductive agent, and a binder. A further aspect of the invention provides a lithium secondary battery comprising: the foregoing positive electrode, a negative electrode, and a separator interposed between the positive electrode and the negative electrode. In the lithium secondary battery, the negative electrode may comprise a silicon oxide ($SiO_x$) or a lithium alloy.

A further aspect of the invention provides a method of preparing a positive active material. The method comprises: providing a mixture comprising $Li_2CO_3$ and $MoO_3$; firing the mixture for about 3 to about 8 hours at a temperature of about 400 to about 750° C. to cause a chemical reaction between $Li_2CO_3$ and $MoO_3$ to provide a lithium molybdenum oxide represented by Formula 1 of $Li_xMoO_3$, where 1<x≤3; subjecting the lithium molybdenum oxide to a first heat treatment for about 2 to about 15 hours under a reduction condition at about 500 to about 1000° C.; and subsequently subjecting the lithium molybdenum oxide to a second heat treatment for about 2 to 15 hours under a reduction condition at about 500 to about 1300° C.

In the foregoing method, a molar ratio of $Li_2CO_3$ to $MoO_3$ may be about 95:100 to about 150:100. The lithium molybdenum oxide may comprise $Li_{1.95}MoO_3$. The lithium molybdenum oxide may comprise $Li_{2.05}MoO_3$. The method may further comprise: adding, to the lithium molybdenum oxide, at least one lithium transition metal oxide selected from the group consisting of: $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-Y}Co_YO_2$, where 0≤Y<1; $LiCo_{1-Y}Mn_YO_2$, where 0≤Y<1; $LiNi_{1-Y}Mn_YO_2$, where 0≤Y<1; $Li(Ni_aCo_bMn_c)O_4$, where 0<a<2, 0<b<2, 0<c<2, and a+b+c=2; $LiMn_{2-Z}Ni_ZO_4$, where 0<Z<2; $LiMn_{2-Z}Co_ZO_4$, where 0<Z<2; $LiCoPO_4$; and $LiFePO_4$. In the foregoing method, a weight ratio of the lithium transition metal oxide to the lithium molybdenum oxide may be about 50:50 to about 99:1. In the Formula 1, x may be about 1.95, or x may be about 2.05.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
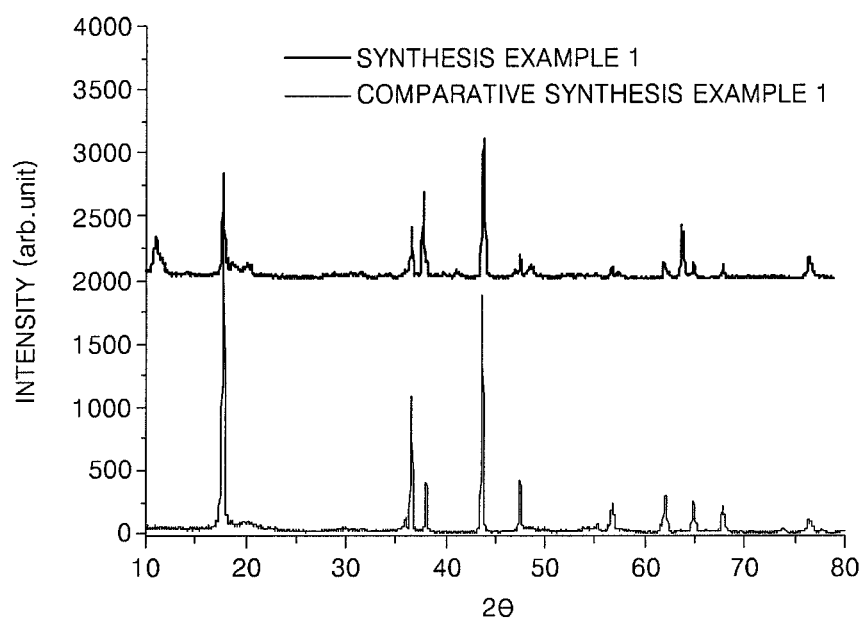
FIG. 1 is X-ray diffraction (XRD) peaks of $Li_{1.95}MoO_3$ and $Li_2MoO_3$ prepared in Example 1 and Comparative Example 1.

Hereinafter, one or more embodiments of the positive active material, positive electrode, lithium secondary battery, and method of preparing the positive active material will be described in greater detail.

According to an embodiment of the present invention, a positive active material includes a lithium molybdenum oxide that has an X-ray diffraction (XRD) pattern with peaks at 11.5±2°, 21±2°, 38±2°, and 64±2° 2 theta (2θ) and is represented by Formula 1 $Li_xMoO_3$, where 1<x≤3. The XRD analysis is performed using CuKα, λ=1.54056 Å, 18 kW, 40.0 kV, and 30.0 mA.

The lithium molybdenum oxide represented by Formula 1 has different structural features from other lithium molybdenum oxides. These structural features cause a remarkable difference in XRD peak patterns, which represent that the lithium molybdenum oxide represented by Formula 1 has a crystalline structure different from the previously known lithium molybdenum oxide(s). Here, the term "previously known lithium molybdenum oxide(s)" is not an admission that the "previously known lithium molybdenum oxide(s)" is known prior art; rather this term simply represents that some lithium molybdenum oxide(s) exist and are known to the applicant.

The previously known lithium molybdenum oxides exhibit no peak at or around 11.5±2° 2 theta (2θ) on the XRD spectrum. However, the lithium molybdenum oxide represented by Formula 1 has a distinct XRD peak at 11.5±2° 2 theta (2θ). The lithium molybdenum oxide represented by Formula 1 has an XRD pattern with peaks at 11.5±2°, 21±2°, 38±2°, and 64±2° 2 theta (2θ).

The previously known lithium molybdenum oxides have an XRD pattern with large peaks at 17±2° and 44±2° 2 theta (2θ); however, and these previously known lithium molybdenum oxides have no peak at 11.5±2° 2 theta (2θ). However, the lithium molybdenum oxide represented by Formula 1 has an XRD pattern with smaller peaks at 17±2° and 44±2° 2 theta (2θ), and has a small but distinct peak at 11.5±2° 2 theta (2θ). With regard to peaks representing a crystal face, the previously known lithium molybdenum oxides exhibit crystalline characteristics between about 20° and about 60° 2 theta (2θ); however, the lithium molybdenum oxide represented by Formula 1 exhibit amorphous characteristics between about 20° and about 60° 2 theta (2θ).

The different XRD pattern represents that the lithium molybdenum oxide of Formula 1 has a new structure that is not present in the other lithium molybdenum oxides known in the art. In fact, when used as a positive active material, the lithium molybdenum oxide represented by Formula 1 exhibits greatly different features from other known positive active materials of lithium secondary batteries including lithium cobalt oxide (LCO), lithium manganese oxide (LMO), nickel cobalt manganese (NCM), nickel cobalt aluminum (NCA), and lithium iron phosphate ($LiFePo_4$).

These materials have high charge capacity in theory; however, in reality their charge capacity is much smaller than their theoretical values. The charge capacity of lithium cobalt oxide (LCO), lithium manganese oxide (LMO), nickel cobalt manganese (NCM), nickel cobalt aluminum (NCA), and lithium iron phosphate ($LiFePo_4$) is respectively 160 mA h/g, 130 mA h/g, 210 mA h/g, 205 mA h/g, and 140 mA h/g. The charge capacity of previously known lithium molybdenum oxide is 340 mA h/g when used in a battery. However, the charge capacity of the lithium molybdenum oxide of Formula 1 is even much greater than the previously known lithium molybdenum oxide.

In embodiments, x in Formula 1 is about 1.95. For example, the lithium molybdenum oxide represented by Formula 1 is $Li_{1.95}MoO_3$. In other embodiments, x is Formula 1 is about 2.05. For example, the lithium molybdenum oxide represented by Formula 1 is $Li_{2.05}MoO_3$.

In embodiments, the positive active material for a secondary battery may include the lithium molybdenum oxide represented by Formula 1 alone. In some other embodiments, the positive active material for a secondary battery may include at least one other lithium transition metal oxide and the lithium molybdenum oxide of Formula 1. The at least one other lithium transition metal oxide may be any other lithium transition metal oxides that are known in the art and that will be developed in the future. For example, the at least one other lithium transition metal oxide may be at least one selected from the group consisting of $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-Y}Co_YO_2$, where 0≤Y<1; $LiCo_{1-Y}Mn_YO_2$, where 0≤Y<1; $LiNi_{1-Y}Mn_YO_2$, where 0≤Y<1; $Li(Ni_aCo_bMn_c)O_4$, where 0<a<2, 0<b<2, 0<c<2, and a+b+c=2; $LiMn_{2-Z}Ni_ZO_4$, where 0<Z<2; $LiMn_{2-Z}Co_ZO_4$, where 0<Z<2; $LiCoPO_4$; and $LiFePO_4$.

When the lithium molybdenum oxide of Formula 1 is used with one or more other lithium transition metal oxides, in embodiments, the ratio of the amount of the at least one other lithium transition metal oxide to the amount of the lithium molybdenum oxide may be in the range of about 50:50 to about 99:1. When the ratio is within this range, a lithium secondary battery including the at least one other transition metal oxide and the lithium molybdenum oxide has excellent electrochemical characteristics while having high charge capacity. For example, the at least one other lithium transition metal oxide may be $LiCoO_2$. For example, the positive active material may include $Li_{1.95}MoO_3$ and $LiCoO_2$ in a weight ratio in the range of about 1:99 to about 50:50.

According to an embodiment of the present invention, a method of preparing a positive active material including: mixing $Li_2CO_3$ and $MoO_3$ to provide a mixture; subjecting the mixture to a condition for chemical reaction to result in the lithium molybdenum oxide represented by Formula 1: $Li_xMoO_3$, where 1<x≤3; subjecting the lithium molybdenum oxide to a first heat treatment; and subjecting the lithium molybdenum oxide to another heat treatment for about 2 to 15 hours under a reduction condition at about 500 to about 1300° C.

In embodiments, the mixing of $Li_2CO_3$ and $MoO_3$ is not limited to any particular method, and any techniques of mixing can be used. In embodiments, the molar ratio of $Li_2CO_3$ to $MoO_3$ may be in the range of about 95:100 to about 150:100.

In embodiments, the reaction of $Li_2CO_3$ and $MoO_3$ occurs by subjecting the mixture to temperatures between about 400 and about 750° C. for about 3 to about 8 hours, which will result in the lithium molybdenum oxide of Formula 1. For example, the lithium molybdenum oxide of Formula 1 may be $Li_{1.95}MoO_3$, or $Li_{2.05}MoO_3$.

In embodiments, the first heat-treatment is performed for about 2 to about 15 hours under a reduction condition at about 500 to about 1000° C. For example, the first heat-treatment may be performed for 10 hours under a nitrogen condition at a temperature of 700° C.

In embodiments, the lithium molybdenum oxide is subject to the second heat-treatment under a reduction condition of about 500 to about 1300° C. For example, the second heat-treatment may be performed for 10 hours under a nitrogen condition at a temperature of 1000° C.

The resultant obtained through the foregoing operations may be pulverized to obtain particles of the positive active material having an average diameter of about 5 to about 10 μm.

In some embodiments, the method may further include adding at least one other lithium transition metal oxide selected from the group consisting of $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-y}Co_yO_2$, where 0≤Y<1; $LiCo_{1-y}Mn_yO_2$, where 0≤Y<1; $LiNi_{1-y}Mn_yO_2$, where 0≤Y<1; $Li(Ni_aCo_bMn_c)O_4$, where 0<a<2, 0<b<2, 0<c<2, and a+b+c=2; $LiMn_{2-z}Ni_zO_4$, where 0<Z<2; $LiMn_{2-z}Co_zO_4$, where 0<Z<2; $LiCoPO_4$; and $LiFePO_4$.

In embodiments, the ratio of the amount of the at least one other lithium transition metal oxide to the amount of the lithium molybdenum oxide may be about 1:99 to about 50:50. When the ratio is within this range, a lithium secondary battery including the at least one other lithium transition metal oxide and the lithium molybdenum oxide has excellent electrochemical characteristics without a reduction in charge capacity.

According to an embodiment of the present invention, a positive electrode may include a positive electrode active material layer having the above-described positive active material, a conductive agent, and a binder.

In embodiments, the positive electrode may be manufactured by molding a mixed positive material into a desired shape or coating the mixed positive material on the current collector, such as a copper foil, an aluminum foil, or the like. For example, the mixed positive material is prepared by mixing the positive active material, a conductive agent, a binder, and a solvent. The mixed positive material may be coated directly on the current collector to manufacture a positive electrode plate. Alternatively, the positive electrode plate may be manufactured by casting the mixed positive material on a separate support to form a positive active material film, separating the positive active material film from the support, and laminating the positive active material film on the current collector, for example, a copper foil. The positive electrode is not limited thereto, and may have various shapes.

The positive active material may be the lithium molybdenum oxide represented by Formula 1 above, which has peaks at 11.5±2°, 21±2°, 38±2°, and 64±2° 2 theta (2θ) on an XRD spectrum, in which amorphous characteristics are found between about 20° and about 60°. The positive active material may be used together with at least one lithium metal oxide selected from the group consisting of $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-y}Co_yO_2$, where 0≤Y<1; $LiCo_{1-y}Mn_yO_2$, where 0≤Y<1; $LiNi_{1-y}Mn_yO_2$, where 0≤Y<1; $Li(Ni_aCo_bMn_c)O_4$, where 0<a<2, 0<b<2, 0<c<2, and a+b+c=2; $LiMn_{2-z}Ni_zO_4$, where 0<Z<2; $LiMn_{2-z}Co_zO_4$, where 0<Z<2; $LiCoPO_4$; and $LiFePO_4$. In this case, the weight ratio of the at least one other lithium transition metal oxide to the lithium molybdenum oxide may be about 1:99 to about 50:50. For example, the at least one other lithium transition metal oxide may be $LiCoO_2$.

According to an embodiment of the present invention, a lithium secondary battery includes a positive electrode including the positive active material discussed above, a negative electrode, and a separator interposed between the positive electrode and the negative electrode.

A method of preparing the lithium secondary battery according to an embodiment of the present invention is a method of preparing a lithium secondary battery including a positive electrode according to an embodiment of the present invention, a negative electrode, a lithium salt containing a non-aqueous electrolyte, and a separator, and may be performed as follows.

A positive electrode and a negative electrode are prepared by respectively coating a positive active material layer composition and a negative active material layer composition on current collectors and drying the resulting products.

A composition for forming the positive active material layer is prepared by mixing a positive active material including the lithium molybdenum oxide represented by Formula 1 and having a predetermined XRD pattern, a conductive agent, a binder, and a solvent.

The positive active material may be used together with at least one other lithium transition metal oxide selected from the group consisting of $LiCoO_2$; $LiNiO_2$; $LiMnO_2$; $LiMn_2O_4$; $Li(Ni_aCo_bMn_c)O_2$, where 0<a<1, 0<b<1, 0<c<1, and a+b+c=1; $LiNi_{1-y}Co_yO_2$, where 0≤Y<1; $LiCo_{1-y}Mn_yO_2$, where 0≤Y<1; $LiNi_{1-y}Mn_yO_2$, where 0≤Y<1; $Li(Ni_aCo_bMn_c)O_4$, where 0<a<2, 0<b<2, 0<c<2, and a+b+c=2; $LiMn_{2-z}Ni_zO_4$, where 0<Z<2; $LiMn_{2-z}Co_zO_4$, where 0<Z<2; $LiCoPO_4$; and $LiFePO_4$, as described above.

The binder facilitates binding between the positive electrode active material and the conducting agent, and binding of the electrode active material layer to the current collector. Examples of the binder include polyvinylidene fluoride (PVDF), polyvinyl alcohols, carboxymethylcellulose (CMC), starch, hydroxypropylcellulose, regenerated cellulose, polyvinylpyrollidone, tetrafluoroethylene, polyethylene, polypropylene, ethylene-propylene-diene terpolymer (EPDM), sulfonated EPDM, styrene butadiene rubber, fluoro rubber, and various copolymers. The amount of the binder may be about 1 to about 50 parts by weight based on 100 parts by weight of the positive active material. When the amount of the binder is within this range, the active material layer may have strong binding ability to the current collector.

The conducting agent is not particularly limited, and may be any material so long as it has a suitable conductivity without causing chemical changes in the battery that is to be formed. Examples of the conductive material include graphite such as natural or artificial graphite; carbon blacks such as acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. The amounts of the positive active material, the conductive agent, and the binder (a binder solvent of 6 wt %) may be in ranges that are commonly used in the art.

A positive electrode current collector is fabricated to have a thickness in the range of about 3 to about 500 μm, and may be any current collector so long as it has high conductivity without causing chemical changes in the battery that is to be formed. Examples of the positive electrode current collector include stainless steel, aluminum, nickel, titanium, sintered carbon, and aluminum or stainless steel that is surface-treated with carbon, nickel, titanium, or silver. The positive electrode current collector is processed to form fine irregularities on the surfaces thereof so as to enhance adhesive strength of the current collector to the positive active material, and may be used in any of various forms including films, sheets, foils, nets, porous structures, foams, and non-woven fabrics.

Separately, a negative active material, a binder, a conductive agent, and a solvent may be mixed to prepare a composition for forming the negative active material layer, and then the negative electrode may be formed by using a general method. Examples of the negative active material may include graphite, a carbon-based material such as carbon, lithium metal, a lithium alloy, and a silicon oxide-based material that may intercalate and deintercalate lithium ions. For example, the negative active material may be silicon oxide ($SiO_x$). A weight ratio of the negative active material to the binder (a binder solution of 6% wt) may be 90:10. Within this range, the negative electrode finally formed has excellent conductivity. The conductive agent and the solvent may be the same as used in the case of the positive electrode.

In addition, a negative electrode current collector is generally fabricated to have a thickness of about 3 to about 500 μm. The negative electrode current collector is not particularly limited, and may be any material so long as it has a suitable conductivity without causing chemical changes in the fabricated battery. Examples of the negative electrode current collector include copper, stainless steel, aluminum, nickel, titanium, sintered carbon, copper or stainless steel that is surface-treated with carbon, nickel, titanium or silver, and aluminum-cadmium alloys. In addition, similar to the positive electrode current collector, the negative electrode current collector may be processed to have fine irregularities on the surfaces thereof so as to enhance adhesive strength of the negative electrode current collector to the negative active material, and may be used in any of various forms including films, sheets, foils, nets, porous structures, foams, and non-woven fabrics.

A separator is interposed between the positive electrode and the negative electrode, which are prepared as described above. The separator has a pore diameter of about 0.01 to about 10 μm and a thickness of about 5 to about 300 μm. Examples of the separator include an olefin-based polymer such as polypropylene, a glass fiber, and a sheet or non-woven fabric formed of polyethylene. When a solid electrolyte such as a polymer is used, the solid electrolyte may also function as the separator.

In embodiments, a lithium salt-containing non-aqueous electrolyte contains a non-aqueous electrolyte solution and lithium. As the non-aqueous electrolyte, a non-aqueous electrolyte solution, an organic solid electrolyte, or an inorganic solid electrolyte may be used. As the non-aqueous electrolyte solution, any of aprotic organic solvents such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Examples of the organic solid electrolyte include polyethylene derivatives, polyethylene oxide derivatives, polypropylene oxide derivatives, phosphoric aicd ester polymers, poly agitation lysine, polyester sulfide, polyvinyl alcohols, polyvinylidene fluoride, and polymers containing ionic dissociation groups. Examples of the inorganic solid electrolyte include nitrides, halides, and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In embodiments, the lithium salt may be a material that is easily dissolved in the lithium salt-containing non-aqueous electrolyte. Examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, aliphatic carboxyl lithium, 4 phenyl boric lithium, and imide.

EXAMPLES

Hereinafter, one or more embodiments of the present invention will be described in detail with reference to the following examples. However, these examples are not intended to limit the scope of the one or more embodiments of the present invention.

Synthesis Example 1

Preparation of Positive Active Material ($Li_{1.95}MoO_3$)

$Li_2CO_3$ and $MoO_3$ powders were mixed in the molar ratio of 98:100, and the $Li_2CO_3$ and $MoO_3$ powders reacted with each other for 5 hours at 500° C. to obtain $Li_{1.95}MoO_3$ having a white and uniform composition. $Li_{1.95}MoO_3$ was then heat-treated for 10 hours under reduction conduction at 700° C., and was cooled. Then, the cooled $Li_{1.95}MoO_3$ was heat-treated for 10 hours under reduction condition at 1000° C.

Synthesis Example 2

Preparation of Positive Active Material ($Li_{2.05}MoO_3$)

$Li_2CO_3$ and $MoO_3$ powders were mixed in the molar ratio of 103:100, and the $Li_2CO_3$ and $MoO_3$ powders reacted with each other for 5 hours at 500° C. to obtain $Li_{2.05}MoO_3$ having a white and uniform composition. $Li_{2.05}MoO_3$ was then heat-treated for 10 hours under reduction conduction at 700° C., and was cooled. Then, the cooled $Li_{2.05}MoO_3$ was heat-treated for 10 hours under reduction condition at 700° C.

Comparative Synthesis Example 1

Preparation of Positive Active Material ($Li_2MoO_3$)

$Li_2CO_3$ and $MoO_3$ powders were mixed in a molar ratio of 1:1, and the $Li_2CO_3$ and $MoO_3$ powders reacted with each other for 5 hours at a temperature of 500° C. to obtain $Li_2MoO_3$ having a white and uniform composition. $Li_2MoO_3$ was then heat-treated for 10 hours under reduction conduction at 700° C., and was cooled.

XRD Analysis

A Scintag X-ray diffraction model XTRA including a Cu-tube solid detector installed therein was used, and a circular standard aluminum sample holder including rough zero background quartz plate having a hole of 25 mm (diameter)×0.5 mm (depth) was used.

The scanning parameters are defined as follows:
Range of 2θ=2 to 80°,
Scanning mode=Continuous scanning,
Stepsize=3°/miniuate, and
CuKα, λ=1.54056 Å

XRD analysis was performed on the lithium molybdenum oxides prepared in Synthesis Example 1 and Comparative Synthesis Example 1. The results are shown in FIG. 1.

Referring to FIG. 1, the lithium molybdenum oxide of Synthesis Example 1 has peaks at 11.5±2°, 21±2°, 38±2°, and 64±2° 2 theta (2θ). The lithium molybdenum oxide of Comparative Synthesis Example 1 has no meaningful peaks at 11.5±2°, 21±2°, 38±2°, and 64±2° 2 theta (2θ).

Figure 2A:
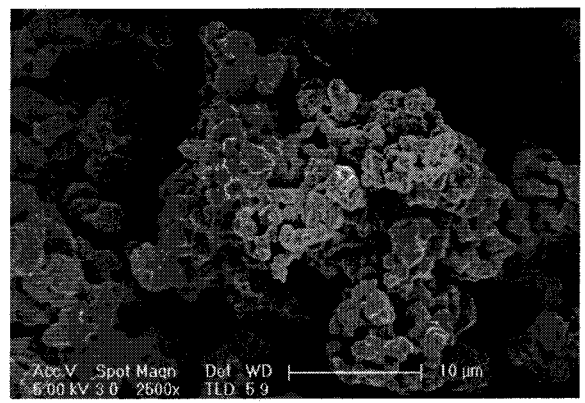
FIGS. 2A and 2B are scanning electron microscope (SEM) images of $Li_{1.95}MoO_3$ prepared in Example 1 respectively before and after $Li_{1.95}MoO_3$ is pressed.
Figure 2B:
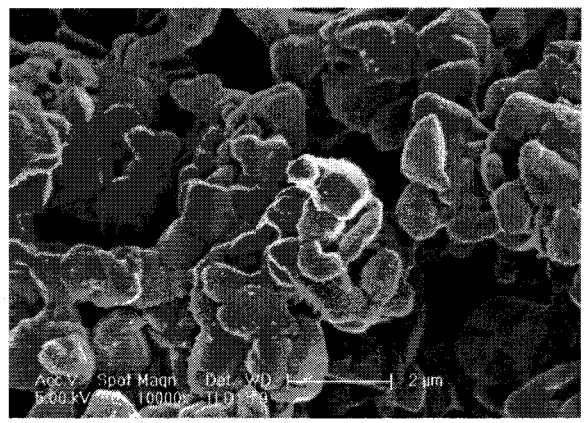
Figure 3A:
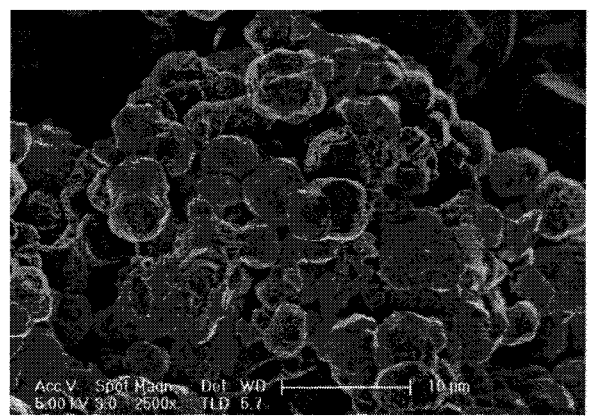
FIGS. 3A and 3B are SEM images of $Li_2MoO_3$ prepared in Comparative Example 1 respectively before and after $Li_2MoO_3$ is pressed.
Figure 3B:
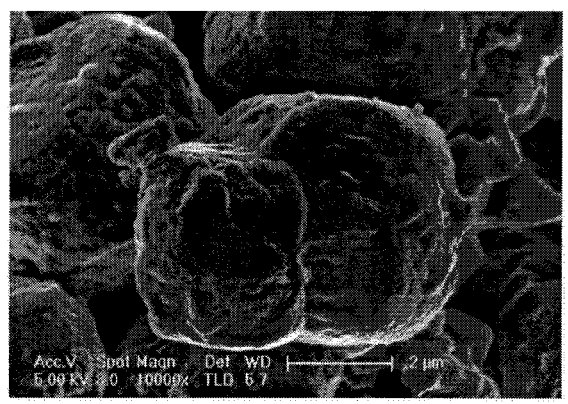

In order to observe microstructures and morphologies of the synthesized lithium molybdenum oxides, scanning electron microscope (SEM) images were taken. SEM images of the lithium molybdenum oxide of Synthesis Example 1 are shown in FIGS. 2A and 2B. SEM images of the lithium molybdenum oxide of Comparative Synthesis Example 1 are shown in FIGS. 3A and 3B.

Referring to FIGS. 2A, 2B, 3A, and 3B, surface morphologies are different between the lithium molybdenum oxide of Synthesis Example 1 and lithium molybdenum oxide of Comparative Synthesis Example 1. It is believed that the different surface morphologies explains at least in part the difference in electrochemical characteristics between the two materials.

Example 1

A positive active material was prepared by using $Li_{1.95}MoO_3$ prepared according to Synthesis Example 1. The positive active material, PVDF (binder), and carbon conductor (conducting agent) were dispersed in weight ratio of 96:2:2 in N-methylpyrrolidone (solvent) to prepare a positive electrode slurry. The positive electrode slurry was coated on aluminum (Al)-foil to form a thin positive electrode plate having thickness of 60 μm, dried at 135° C. for 3 hours, and pressed to manufacture a positive electrode.

Separately, a negative electrode was formed of a lithium metal. 1.5 M $LiPF_6$ was added to a solvent prepared by mixing ethylene carbonate (EC), ethylmethyl carbonate (EMC), and dimethyl carbonate (DMC) in volume ratio of 3:3:4 to prepare an electrolyte. The negative electrode and the positive electrode were wound using a porous polyethylene (PE) film as a separator to form an electrode assembly, and pressed and placed into a battery case. Then, the electrolytic solution was injected into the battery case to prepare a lithium secondary battery.

Example 2

$LiCoO_2$ and $Li_{1.95}MoO_3$ prepared according to Synthesis Example 1 were mixed in weight ratio of 80:20 to prepare a positive active material. The positive active material, PVDF (binder), and carbon conductor (conducting agent) were dispersed in weight ratio of 96:2:2 in N-methylpyrrolidone (solvent) to prepare a positive electrode slurry. The positive electrode slurry was coated on aluminum (Al)-foil to form a thin positive electrode plate having thickness of 60 μm, dried at 135° C. for 3 hours, and pressed to manufacture a positive electrode.

In addition, a negative electrode, an electrolyte, and a separator were prepared in the same manner as in Example 1 to prepare a high-capacity lithium secondary battery.

Example 3

A positive electrode and a lithium secondary battery were prepared in the same manner as in Example 1 except that $Li_{2.05}MoO_3$ of Synthesis Example 2 was used instead of $Li_{1.95}MoO_3$ prepared in Synthesis Example 1 for preparing the positive electrode.

Comparative Example 1

A positive electrode and a lithium secondary battery were prepared in the same manner as in Example 1 except that $Li_2MoO_3$ of Comparative Synthesis Example 1 was used instead of $Li_{1.95}MoO_3$ prepared in Synthesis Example 1 for preparing the positive electrode.

Comparative Example 2

A positive electrode and a lithium secondary battery were prepared in the same manner as in Example 2 except that $Li_2MoO_3$ of Comparative Synthesis Example 1 was used instead of $Li_{1.95}MoO_3$ prepared in Synthesis Example 1 for preparing the positive electrode.

With regard to the lithium batteries prepared in Examples 1 through 3, and Comparative Examples 1 and 2, weight ratios of $LiCoO_2$ and $Li_xMoO_3$ are shown in Table 1.

TABLE 1

| | Weight Ratio of $LiCoO_2:Li_xMoO_3$ |
|---|---|
| Example 1 | $LiCoO_2:Li_{1.95}MoO_3 = 0:100$ |
| Example 2 | $LiCoO_2:Li_{1.95}MoO_3 = 80:20$ |
| Example 3 | $LiCoO_2:Li_{2.05}MoO_3 = 80:20$ |
| Example 1 | $LiCoO_2:Li_2MoO_3 = 0:100$ |
| Example 2 | $LiCoO_2:Li_2MoO_3 = 80:20$ |

Figure 4:
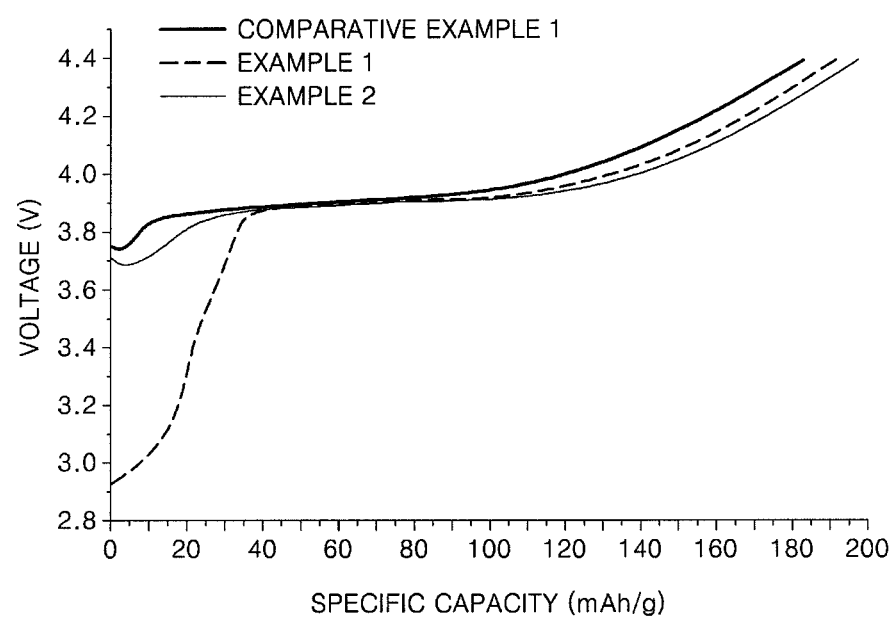
FIG. 4 illustrates charge capacities of batteries prepared in Examples 1 and 2, and Comparative Example 1.

Charge capacity was measured for the lithium batteries of Examples 1 and 2, and Comparative Example 1. The measured results are shown in FIG. 4, in which the charge capacity of the lithium batteries of Examples 1 and 2 are higher, compared to that of the lithium secondary battery of Comparative Example 1.

Figure 5:
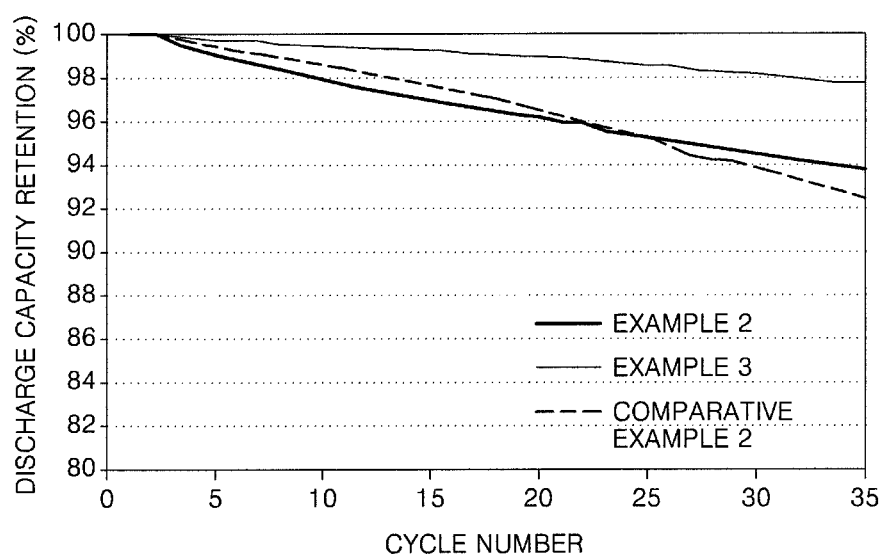
FIG. 5 illustrates lifetime characteristics of batteries prepared in Examples 2 and 3, and Comparative Example 2.

Charge capacity retention (lifetime characteristics) was measured for the lithium batteries of Examples 2 and 3, and Comparative Example 2. The measured results are shown in FIG. 5, in which the lithium batteries of Examples 2 and 3 have higher charge capacity retention, compared to that of the lithium secondary battery of Comparative Example 2.

As described above, the lithium secondary battery according to embodiments of the present invention may have an increased charge capacity.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A positive active material comprising $LiCoO_2$ and $Li_{2.05}MoO_3$, wherein a weight ratio of $LiCoO_2$ and $Li_{2.05}MoO_3$ is 80:20.

2. The positive active material of claim 1, wherein the $Li_{2.05}MoO_3$ is in the form of particles having an average diameter from about 5 to about 10 μm.

3. A positive electrode comprising the positive electrode active material layer including material of claim 1, a conductive agent, and a binder.

4. A lithium secondary battery comprising:
the positive electrode of claim 3,
a negative electrode, and
a separator interposed between the positive electrode and the negative electrode.

5. The lithium secondary battery of claim 4, wherein the negative electrode comprises a silicon oxide ($SiO_x$) or a lithium alloy.

6. A method of preparing the positive active material of claim 1, the method comprising:
providing a mixture comprising $Li_2CO_3$ and $MoO_3$;
firing the mixture for about 3 to about 8 hours at a temperature of about 400 to about 750° C. to cause a chemical reaction between $Li_2CO_3$ and $MoO_3$ to provide a lithium molybdenum oxide represented by $Li_{2.05}MoO_3$;
subjecting the lithium molybdenum oxide to a first heat treatment for about 2 to about 15 hours under a reduction condition at about 500 to about 1000° C.; and
subsequently subjecting the lithium molybdenum oxide to a second heat treatment for about 2 to 15 hours under a reduction condition at about 500 to about 1300° C.,
thereby providing a positive active material comprising $LiCoO_2$ and $Li_{2.05}MoO_3$, wherein a weight ratio of $LiCoO_2$ and $Li_{2.05}MoO_3$ is 80:20.

7. The method of claim 6, wherein a molar ratio of $Li_2CO_3$ to $MoO_3$ is about 95:100 to about 150:100.

8. The positive active material of claim 1, wherein $Li_{2.05}MoO_3$ has a X-ray diffraction (XRD) pattern with peaks at $11.5\pm2°$, $21\pm2°$, $38\pm2°$, and $64\pm2°$ 2-theta ($2\theta$).

* * * * *